Dec. 1, 1936. H. A. LEWIS Re. 20,190

DETONATOR

Original Filed May 2, 1933

Harold A. Lewis INVENTOR

BY Fred Sloan

ATTORNEY

Reissued Dec. 1, 1936 Re. 20,190

UNITED STATES PATENT OFFICE 20,190

DETONATOR

Harold A. Lewis, Wilmington, Del., assignor to E. I. du Pont de Nemours & Company, Wilmington, Del., a corporation of Delaware Original No. 1,991,857, dated February 19, 1935, Serial No. 668,921, May 2, 1933. Application for reissue October 8, 1936, Serial No. 104,685

4 Claims. (Cl. 102—8)

Figure 1:
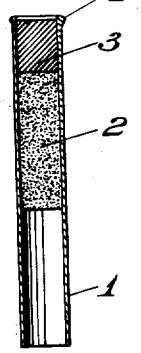

This invention relates to an improved detonator and more particularly to a detonator adapted for use as a fuse connector for connecting one line of detonating fuse to another line, in order that detonation of the second line from the first may be assured.

Several kinds of detonating fuses are known, of which Cordeau is the one most commonly used. This consists of a small lead tube filled with an explosive compound, trinitrotoluene for example, which has a very high velocity of detonation, over 16,000 feet per second at the density employed. Cordeau is used principally in deep well-drill holes and in other large blasts where it is desired that a number of different charges shall explode almost simultaneously. The extreme violence with which it explodes is sufficient to detonate high explosives adjacent to it in a bore hole so that Cordeau finds particular use in this manner. In actual work in the field, Cordeau is brought to explosion by means of ordinary or electric blasting caps, which must be in direct contact with the explosive compound contained in the Cordeau.

In the use of Cordeau and in connecting the main line of fuse with the branch lines leading to the separate bore holes, various methods have been used. The usual practice, however, has been to split a section of the branch line of Cordeau for the distance of about 3'' at the end, and to pull the split ends apart to form a crotch. The main or trunk line of Cordeau is placed well down in these crotches, and the split ends are wrapped around the main line, one to the right and the other to the left. A blasting cap connected to the end of the line of fuse is fired in order to bring about the detonation of the entire blast.

Another type of fuse, which has been employed, consists of a high explosive core contained in a flexible and combustible outer covering. One form used, for example, has contained pentaerythrite tetranitrate as the high exlosive, covered with collodion and counterings of cotton cord, rubber and the like, either by themselves or in combination. The advantage of such fuse lies in the higher velocity of detonation, approximately 22,000 feet per second. An additional point of superiority has been claimed, namely that, with such detonating fuse, branch lines may be satisfactorily connected by simply tying to the main line.

The practice outlined in the foregoing has the disadvantage that misfires frequently occur, in the case of Cordeau, at the connection of the trunk line with the branch lines extending into the bore hole because of the poor contact of the material in the two lines of fuse. A further and important disadvantage comes from the fact that such a connection is not water-tight. Another drawback is that, while the detonation wave is usually propagated to branch lines leading off at angles not greater than 90°, the propagation is questionable when the branch line goes off at an obtuse angle.

A more satisfactory method of making a connection between the main line of detonating fuse and the branch lines consists in employing a modified form of blasting cap shell adapted to fit over the end of the branch line of fuse, and having its closed end secured to means adapted to engage the main line. In fitting such a shell onto the fuse, the cap can be crimped tightly. Using such a method the advantages obtained are that a water-tight connection is secured, that the likelihood is reduced of the occurrence of misfires, and that propagation is certain even when the communicating fuse line leads off at an obtuse angle.

The object of my invention is to provide a detonator suitable for the latter method of connecting fuse lines. A further object is a detonator having its primary and secondary charges so arranged as to introduce the minimum of hazard and to bring about the propagation of the detonation most certainly from one line of detonating fuse to the other. A still further object is a detonator containing a minimum primary charge and attaining its maximum velocity almost instantaneously. Additional objects will be disclosed as the invention is described further.

These objects are accomplished according to my invention, wherein a detonator is provided consisting of a tubular shell containing a primary charge of lead azide and a secondary or main charge of a detonating explosive. Contrary to the usual practice in the loading of blasting caps, however, my invention places the primary charge of lead azide at the bottom of the cap adjacent to the closed end of the shell. The secondary charge is then loaded on the top of the lead azide. Preferably the cap shell has arrangements also for the ready attachment of its closed end to the main line of fuse.

In order to illustrate more clearly my invention, reference is made to the accompanying drawing, in Figure 1 of which 1 represents a tubular shell, preferably of aluminum, 2 a secondary charge of explosive such as tetryl, and 3 a primary charge of lead azide. 4 designates a bead at the closed end of the shell adapted to engage a clip for the secure attachment of the cap to the main line of Cordeau, through such bead is not a part of my invention. When in use in the field as a fuse connector, the cap shell will fit over the end of the branch line of detonating fuse leading to the bore hole, the fuse being inserted until it rests against the charge 2. The detonator is then crimped firmly onto the fuse. The detonator is brought to the main line of fuse and fastened so that the closed end is butted up against the trunk line and secured in that position.

Figure 2:
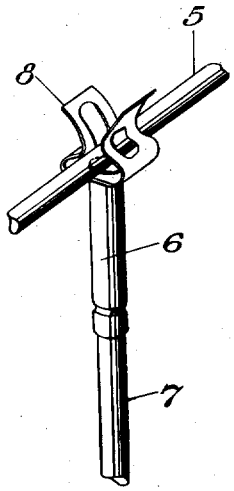

Figure 2 illustrates one method of use of such a detonator as a detonating fuse connector, in which the shell 6 encloses the end of the fuse line 7. The bead at the upper end of the shell engages a clip 8 by insertion of the detonator 6 through an opening in the base of the clip until the edges of the opening engages the bead. The clip can then readily be made secure to the main line of detonating fuse 5.

I find lead azide the most suitable primary charge for my detonator. Lead azide has the combined advantages over all other primary detonating compounds of safety in use and immediate pick-up to its maximum velocity. Because of this latter property, this compound, for a given weight of material, attains its maximum velocity quicker than other primary detonating compounds such as mercury fulminate. My invention is directed, therefore, to the use of lead azide as a primary charge. As a secondary charge I may use various suitable high explosive compounds, taken preferably from the three classes that may be designated as (1) nitramines, (2) solid nitric esters, and (3) aromatic nitrocompounds. As suitable secondary charges from the foregoing classes, I may cite trimethylene trinitramine and tetryl in Class 1, pentaerythrite tetranitrate, erythritol tetranitrate, and nitrostarch in Class 2, and trinitrotoluene and picric acid in Class 3. Preferably I employ tetryl. In loading my improved detonator, the lead azide is first pressed to the bottom of the shell, for example, 3.5 grains. On top of this is pressed the desired amount of the secondary charge.

Whereas the customary way of loading detonators is to introduce the secondary charge first and to superimpose the primary charge on this charge, which is the logical arrangement for the usual method of employing such detonators, my detonator, with the positions of the primary and secondary charges reversed, possesses great advantages under certain conditions of use. For example, when the detonator is employed in the manner suggested heretofore, namely for connecting branch lines to main lines of detonating fuse, such a reversed arrangement of charges has the particular advantage of making the detonator much safer in handling and use, since the relatively insensitive secondary charge is the one that is exposed to the friction of the end of the branch line. In this way all hazards of premature detonation from this cause are removed.

It will be understood that my invention is not limited to any particular type of shell. While aluminum is my preferred shell metal, any metal compatible with lead azide may be employed. Similarly, my improved detonator may be applied to uses other than as a fuse connector, in fact in all places where the arrangement described gives advantages. It will be understood also, of course, that the bead or other arrangement on the shell for facilitating the attachment of the detonator to a fuse line is not a part of my invention. I intend to be limited in my invention only as indicated in the following patent claims:

I claim:

1. A detonator or blasting cap comprising a shell or tube having a closed end, a secondary or main charge, and a primary charge of detonating material in the tube, the primary charge being nearest to the closed end of the tube.

2. The detonator or blasting cap of claim 1 in which the primary charge comprises fulminate of mercury.

3. The detonator or blasting cap of claim 1 in which the main charge comprises tetryl.

4. The detonator or blasting cap of claim 1, in which the primary charge comprises lead azide.

HAROLD A. LEWIS.